No. 671,409. Patented Apr. 2, 1901.
H. L. F. TREBERT.
BRAKE.
(Application filed Dec. 30, 1899.)
(No Model.) 2 Sheets—Sheet 1.
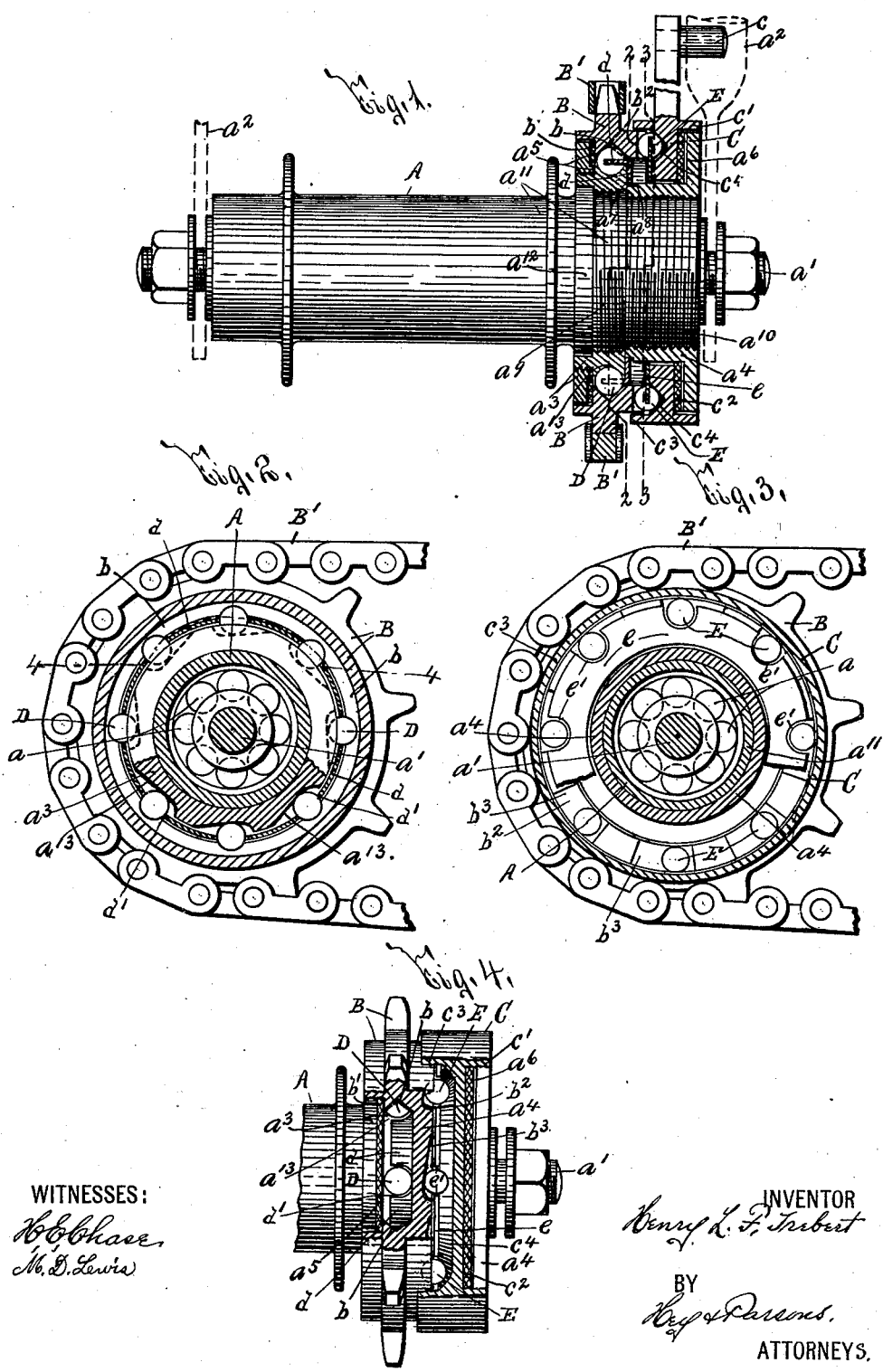
WITNESSES:
INVENTOR
Henry L. F. Trebert
BY
ATTORNEYS.

No. 671,409. Patented Apr. 2, 1901.
H. L. F. TREBERT.
BRAKE.
(Application filed Dec. 30, 1899.)
(No Model.) 2 Sheets—Sheet 2.
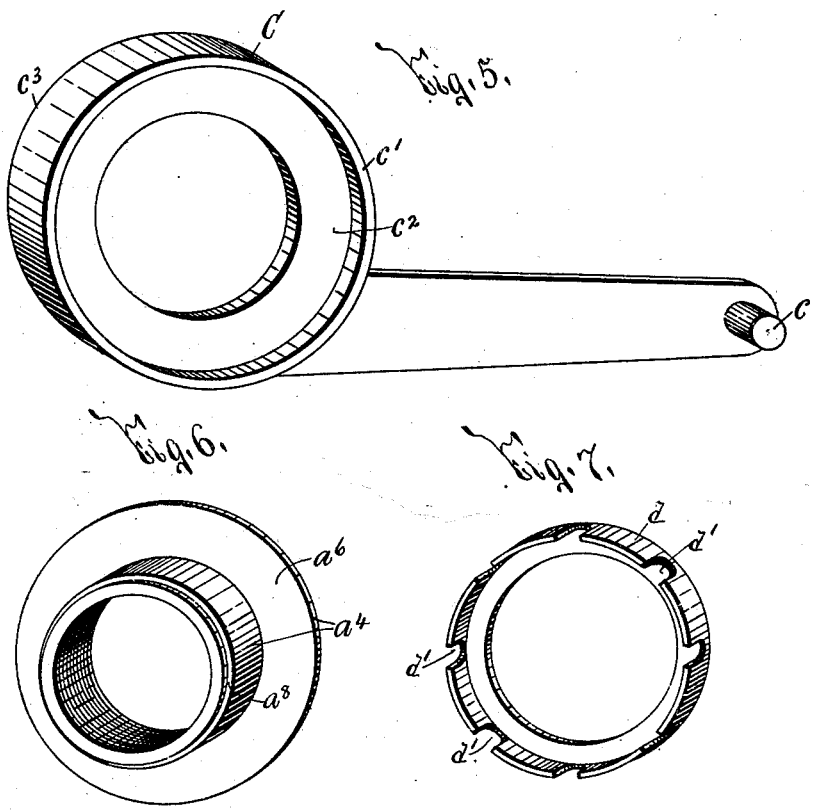

UNITED STATES PATENT OFFICE.

HENRY L. F. TREBERT, OF SYRACUSE, NEW YORK.

BRAKE.

SPECIFICATION forming part of Letters Patent No. 671,409, dated April 2, 1901.

Application filed December 30, 1899. Serial No. 742,035. (No model.)

*To all whom it may concern:*

Be it known that I, HENRY L. F. TREBERT, of Syracuse, in the county of Onondaga and State of New York, have invented certain new and useful Improvements in Brakes, of which the following is a specification.

My invention relates to improvements in vehicle-brakes, and has for its object the production of a mechanism for the desired purpose which is particularly simple in construction, strong and durable in use, and highly efficient in operation; and to this end it consists in the combination, construction, and arrangement of the component parts of a vehicle-brake, as hereinafter fully described, and pointed out in the claims.

In describing this invention reference is had to the accompanying drawings, forming part of this specification, in which like letters indicate corresponding parts in all the views.

Figure 1 is an elevation, partly in section, of my vehicle-brake, adjacent parts of a vehicle-frame being indicated by dotted lines. Figs. 2 and 3 are vertical sectional views taken, respectively, on lines 2 2 and 3 3, Fig. 1. Fig. 4 is a sectional view taken on line 4 4, Fig. 2, the chain shown in the preceding figures being omitted. Figs. 5, 6, and 7 are isometric views, respectively, of the non-revoluble brake member, one of the engaging parts of the driven member, and one of the connecting members of my invention.

My vehicle-brake comprises a driven member A, a driving member B, a non-revoluble brake member C, and means for locking the driven and driving members together and for coöperating with the driving and brake members for retarding the revolution of the driven member. As preferably constructed the driven member A consists of the hub of the driving-wheel of a vehicle, although it may consist of any other desirable revoluble part. Said driven member is mounted upon any suitable bearing $a$ and encircles an axle $a'$, secured by any desirable means to the vehicle-frame $a^2$. One end of the driven member A is provided with engaging parts $a^3 a^4$, having their adjacent sides or ends formed with frictional engaging surfaces $a^5 a^6$ and with separated surfaces $a^7 a^8$, interposed between the surfaces $a^5 a^6$ and arranged substantially parallel therewith. Said engaging parts $a^3 a^4$ are here illustrated as consisting of collars or flanges screwing upon threaded surfaces $a^9 a^{10}$, arranged side by side upon the main portion $a^{11}$ of the member A and formed of unequal diameter, one surface $a^9$ being of greater diameter than the other and arranged adjacent to an annular shoulder $a^{12}$, also provided on said main portion $a^{11}$ and engaged with the contiguous face of the engaging part $a^3$. One of the engaging parts $a^3 a^4$, or, if desired, any other suitable portion of the revoluble member A, is provided with a peripheral face $a^{13}$, arranged between the surfaces $a^5 a^6$ and having portions thereof extended outwardly from the axis of said member A toward their front ends and the contiguous portions of the inner face $b$ of the driving member B, presently described. In the preferable construction of my invention said peripheral face $a^{13}$ is formed upon the engaging part $a^3$, and the portion of said engaging part provided with the surface $a^5$ is formed detachable from the remaining portion of said engaging part. Said engaging parts when constructed as described are rigid with the remaining or main portion of the driven member A and are firmly secured in position without liability of detachment.

The driving member B is usually revolubly mounted on one end of the driven member A, between the engaging surfaces $a^5 a^6$. Its periphery is suitably formed for engaging a sprocket-chain B', and its inner portion is provided with a face $b$ and end engaging surfaces $b' b^2$. The face $b$ is generally formed with a groove of angular cross-section and encircles the face $a^{13}$ of the driven member, being substantially concentric with said face $a^{13}$. The surface $b'$ is substantially flat and coöperates with the surface $a^5$ of the driven member A, and the surface $b^2$ is provided with portions $b^3$, inclining from their rear ends toward the surface $a^6$.

The brake member C surrounds a portion of the driven member A, is interposed between the surface $a^6$ of the engaging part $a^4$ and the driving member B, and is prevented from revoluble movement by a shoulder $c$ or other suitable means engaged with the vehicle-frame $a^2$. One side of the brake member C is provided with a lateral extension or tongue $c'$ encircling the contiguous portion of the engaging part $a^4$ and with an engaging surface $c^2$ engaging or coöperating with the surface $a^6$. The other side of said brake member is provided with an extension or tongue $c^3$ encircling the contiguous portion of the driving member and with an engaging face $c^4$ usually formed with a groove of angular cross-section.

The means for locking the driven and driving members together is preferably composed of clutch members D and a connecting member $d$. The clutch members D usually consist of rolling balls, are interposed between the peripheral face $a^{13}$ of the driven member A and the inner face $b$ of the driving member B, are movable in the groove in the face $b$ into their operative position to lock the driven and driving members together as the driving member is moved forwardly, and assume their inoperative position to permit the driven member to rotate independently of the driving member as said driving member is held stationary. The connecting member $d$ is here illustrated as consisting of a ring arranged substantially parallel with the surfaces $a^7$ $a^8$ of the driven member A and interposed between said surfaces $a^7$ $a^8$, which form annular shoulders on the driven member A for preventing endwise movement of the connecting member. Said connecting member moves or actuates all of the clutch members D simultaneously and is usually provided with a laterally-extending flange, which is formed of greater diameter than one of the surfaces $a^7$ $a^8$ and is provided with openings $d'$ for receiving the clutch members and interposed arms for engaging said clutch members.

The means for coöperating with the driving and brake members to retard the revoluble movement of the driven member A is usually composed of clutch members E and a connecting member $e$. The clutch members E preferably consist of rolling balls, which are engaged with the surfaces $b^2$ $c^4$ of the driving and brake members B C, are movable substantially lengthwise of the axis of the member A in the groove in the face $c^4$ into their operative position as the member B is rotated backwardly, and assume their inoperative position as said member is rotated forwardly. When the clutch members E are moved into their coöperative position by the backward movement of the driving member B, said clutch members and the driving and brake members transmit substantially equal pressure to the engaging parts $a^3$ $a^4$ in opposite directions substantially lengthwise of the axis of the driven and driving members, and thereby retard the revolution of said member A without transmitting strain to the bearings therefor. The connecting member $e$ serves to move or actuate all of the clutch members E simultaneously and preferably consists of a ring interposed between contiguous surfaces of the driving and brake members B C and formed with openings $e'$ in its peripheral portion for receiving the members E and interposed arms for engaging said clutch members.

The construction and operation of my vehicle-brake will now be understood upon reference to the foregoing description and the accompanying drawings, and it will be obvious to those skilled in the art that more or less change may be made in the component parts of said brake without departing from the spirit of my invention.

Having thus fully described my invention, what I claim as new, and desire to secure by Letters Patent, is—

1. In a vehicle, the combination of two revoluble members, one being provided with two engaging surfaces and one being movable relatively to the other, said members being provided with substantially concentric engaging faces, means between the substantially concentric engaging faces for locking the revoluble members together, a non-revoluble brake member surrounding a portion of one of the revoluble members and interposed between said two engaging surfaces, and rolling clutch members movable lengthwise of the axis of the revoluble members and engaging the brake member and one of the revoluble members for transmitting substantially equal pressure to said two engaging surfaces in opposite directions substantially lengthwise of the axis of the revoluble members and thereby retarding the revolution of one of said revoluble members, substantially as and for the purpose described.

2. In a vehicle, the combination of two revoluble members, one being movable relatively to the other, said members being provided with substantially concentric engaging faces, rolling clutch members between said engaging faces for locking the revoluble members together, a connecting member for moving the clutch members simultaneously, a non-revoluble brake member surrounding a portion of one of the revoluble members, and clutch members movable substantially lengthwise of the axis of the revoluble members and coöperating with the brake member and one of the revoluble members for retarding the revolution of the other of said revoluble members, substantially as and for the purpose specified.

3. In a vehicle, the combination of two revoluble members, one being movable relatively to the other, said members being provided with substantially concentric engaging faces, rolling clutch members between said engaging faces for locking the revoluble members together, a connecting member for moving the clutch members simultaneously, a non-revoluble brake member surrounding a portion of one of the revoluble members, clutch members movable substantially lengthwise of the axis of the revoluble members and coöperating with the brake member and one of the revoluble members for retarding the revolution of one of the revoluble members, and a connecting member for moving the latter clutch members simultaneously, substantially as and for the purposes set forth.

4. In a vehicle, the combination of two revoluble members, one being provided with two engaging surfaces and one being movable relatively to the other, said members being provided with substantially concentric engaging faces, rolling clutch members between the substantially concentric engaging faces for locking the revoluble members together, a connecting member for moving the clutch members simultaneously, a non-revoluble brake member surrounding a portion of one of the revoluble members and interposed between said two engaging surfaces, rolling clutch members movable substantially lengthwise of the axis of the revoluble members and engaging the brake member and one of the revoluble members for transmitting substantially equal pressure to said two engaging surfaces in opposite directions substantially lengthwise of the axis of the revoluble members and thereby retarding the revolution of one of said revoluble members, and a connecting member for moving the latter clutch members simultaneously, substantially as and for the purpose described.

5. In a vehicle, the combination of a driven member provided with two engaging surfaces and a peripheral face between said surfaces, a driving member mounted on the driven member and provided with an inner face surrounding said peripheral face and with end engaging surfaces, one of said end engaging surfaces being engaged with one of said two engaging surfaces of the driven member, rolling clutch members for engaging said peripheral face of the driven member and said inner face of the driving member, a non-revoluble brake member surrounding a portion of said peripheral face and interposed between the other of said two engaging surfaces of the driven member and the adjacent engaging end surface of the driving member, and rolling clutch members movable substantially lengthwise of the axis of the revoluble members and engaging the contiguous surfaces of the driving member and the brake member, substantially as and for the purpose described.

In testimony whereof I have hereunto signed my name, in the presence of two attesting witnesses, at Syracuse, in the county of Onondaga, in the State of New York, this 12th day of April, 1899.

HENRY L. F. TREBERT.

Witnesses:
ARTHUR E. PARSONS,
K. H. THEOBALD.